United States Patent
Kasukawa et al.

[11] Patent Number: 6,062,933
[45] Date of Patent: May 16, 2000

[54] CATHODE RAY TUBE AND MANUFACTURING APPARATUS FOR THE SAME

[75] Inventors: Shinji Kasukawa, Takatsuki; Akihiko Fukuyama, Utsunomiya; Koji Takahashi, Tochigi-ken, all of Japan

[73] Assignee: Matsushita Electric Industrial Co., Ltd., Osaka, Japan

[21] Appl. No.: 09/390,958

[22] Filed: Sep. 3, 1999

[30] Foreign Application Priority Data

Sep. 10, 1998 [JP] Japan .................................. 10-256545

[51] Int. Cl.[7] ...................................................... H01J 9/26
[52] U.S. Cl. .............................. 445/45; 269/156; 279/133
[58] Field of Search ........................ 445/45, 34; 279/106, 279/133; 269/156

[56] References Cited

U.S. PATENT DOCUMENTS

| | | | |
|---|---|---|---|
| 952,364 | 3/1910 | Schultis | 269/156 |
| 3,941,364 | 3/1976 | Hjelm et al. | 269/156 |
| 4,731,040 | 3/1988 | Tominaga et al. | 445/45 |
| 5,282,403 | 2/1994 | Rouleau | 279/133 |

FOREIGN PATENT DOCUMENTS 61-264632  11/1986  Japan .

*Primary Examiner*—Kenneth J. Ramsey
*Attorney, Agent, or Firm*—Price Gess & Ubell

[57] ABSTRACT

A manufacturing apparatus for a cathode ray tube attaches an electron gun to a neck of a glass valve while grasping the neck with a chuck apparatus. The chuck apparatus has at least three chuck members, a chuck member holding unit and an interlocking unit. Each chuck member has a neck contacting surface that lies on a single plane that is parallel with a central axis of the neck. The chuck member holding unit holds the chuck members so as to allow movement of the neck contacting surface of each chuck member from a periphery of the neck toward the central axis of the neck. The interlocking unit causes an interlocked movement of the chuck members so that the neck contacting surface of each chuck member moves with an equal displacement toward the central axis of the neck.

13 Claims, 9 Drawing Sheets

CATHODE RAY TUBE AND MANUFACTURING APPARATUS FOR THE SAME

This application is based on an application No. 10-256545 filed in Japan, the content of which is hereby incorporated by reference.

BACKGROUND OF THE INVENTION

1. Field of the Invention

The present invention relates to a manufacturing apparatus for a cathode ray tube for use in a television set, a computer monitor, or the like. In particular, the invention relates to a manufacturing apparatus for a cathode ray tube where the stem of the electron gun and the glass bulb are welded together during the sealing process.

2. Related Art

To produce optimal images with favorable convergence on the phosphor screen of the glass bulb of a cathode ray tube, the axis of the electron gun has to be in alignment with the axis of the glass bulb. A conventional cathode ray tube manufacturing apparatus achieves this by holding the neck of the glass bulb with its axis aligned with the axis of the electron gun during the sealing process where the electron gun is sealed into the neck of the glass bulb. In this process, the electron gun is inserted into the neck in alignment with the axis of the neck, and a sealing burner is used to seal the stem of the electron gun in the neck of the glass bulb.

FIG. 1 shows a conventional manufacturing apparatus that is disclosed by Japanese Laid-Open Patent Application S61-264632. This manufacturing apparatus has a base plate 3 with a bulb receptacle 2 for supporting a glass bulb 1 having a neck 1a so that the axis of the glass bulb 1 is roughly aligned. A bulb securing mechanism 4 is provided on the upper surface of this base plate 3 and a neck chuck mechanism 6 is provided on the lower surface of the base plate 3. The bulb securing mechanism 4 engages the widest-part side surface 1b of the glass bulb 1 at the opposite end to the neck 1a and correctly positions the glass bulb 1 with respect to rotation about the axis of the glass bulb 1. The neck chuck mechanism 6 clamps the neck 1a so that the axis of glass bulb 1 is aligned with the axis of the electron gun 5 that is inserted into the neck 1a.

As shown in FIG. 2, the neck chuck mechanism 6 is composed of a pair of clamping arms 7a, 7b and a spring 10. These clamping arms 7a, 7b cross over one another in the middle and are freely rotatable about the pivot 8. V-shaped engaging grooves 9a, 9b are formed at one end of these clamping arms 7a, 7b, and the spring 10 is stretched between the clamping arms 7a, 7b at the other end to energize the ends featuring the engaging grooves 9a, 9b toward one another.

Due to the V-shape of the engaging grooves 9a, 9b, each of the clamping arms 7a, 7b comes into contact with the neck 1a of the glass bulb in two places, labeled C1, C2 and E1, E2 in FIG. 2. Once the neck 1a of the glass bulb 1 has been clamped by the engaging grooves 9a, 9b in the clamping arms 7a, 7b of the neck chuck mechanism 6 so that the axis of the glass bulb 1 is aligned with the axis of the electron gun 5, the neck 1a of the glass bulb 1 is heated using the sealing burner 11, which results in the neck 1a and the stem 5a of the electron gun 5a being welded together.

This conventional cathode ray tube manufacturing apparatus has the following drawback. When the neck 1a of the glass bulb 1 and the stem 5a of the electron gun 5 are sealed, the heat of the sealing burner 11 causes thermal expansion in the clamping arms 7a, 7b that are clamping the neck 1a. This results in an increase in the distance L between the pivot 8 and the engaging grooves 9a, 9b of the clamping arms 7a, 7b that clamp the neck 1a, and shifts the axis Y of the glass bulb 1 away from the axis of the electron gun 5.

As described above, a conventional neck chuck mechanism 6 is constructed so that the hinged clamping arms 7a, 7b rotate to clamp the neck 1a. When this neck chuck mechanism 6 is used to hold necks with different outside diameters (as when manufacturing different types of glass bulb or when there is variation in the outside diameter of the neck for a same type of glass bulb), such differences will shift the axis Y of the glass bulb 1. In more detail, as the outside diameter D of the neck 1a increases, the angle between the clamping arms 7a, 7b increases in the direction labeled direction B in FIG. 2. This reduces the distance L between the pivot 8 and the position at which the neck 1a is clamped by the engaging grooves 9a, 9b. The opposite is also true, so that as the outside diameter D of the neck 1a decreases, the angle between the clamping arms 7a, 7b decreases in the direction B which increases the distance L between the pivot 8 and the position at which the neck 1a is clamped by the engaging grooves 9a, 9b. This means that changes in the outside diameter of the neck 1a slightly shift the axis of the glass bulb and cause misalignment between the respective axes of the electron gun 5 and the glass bulb 1.

SUMMARY OF THE INVENTION

The present invention was conceived to overcome the problems described above, and has an object of enabling the manufacture of cathode ray tubes where the glass bulb and the electron gun are precisely aligned. The invention aims to achieve this by overcoming the effects of the heat (supplied by a sealing burner or the like) used during sealing process that seals the electron gun in the glass bulb, and to enable the manufacture of a variety of glass bulbs using the same equipment.

This object can be achieved by a cathode ray tube manufacturing apparatus that holds a neck of a glass bulb using a chuck apparatus and seals an electron gun in the neck, the chuck apparatus including: at least three chuck members, each chuck member having a neck contacting surface that lies on a single plane that is parallel with a central axis of the neck; and a chuck member holding unit for holding the chuck members so as to allow movement of the neck contacting surface of each chuck member from a periphery of the neck toward the central axis of the neck.

The object can also be achieved by a manufacturing method for manufacturing a cathode ray tube, the manufacturing method including a holding step for holding a glass bulb and an attaching step for attaching an electron gun in a neck of the glass bulb, the holding step including: a first substep for supporting a funnel of the glass valve using a receptacle part of a receptacle member that is disposed in an approximately horizontal state; a second substep for grasping the neck so that a central axis of the neck is aligned with an axis of the electron gun, using a chuck mechanism having at least three chuck members, each chuck member having a neck contacting surface that contacts a part of the neck protruding downwards through the receptacle part of the receptacle member, each neck contacting surface contacting the neck on a single plane that is parallel to the central axis of the neck.

With the above manufacturing apparatus and manufacturing method, if the heat of a sealing burner during the sealing process causes thermal expansion in the chuck members, or if a variety of glass bulbs are manufactured using the same equipment, the neck contacting surface of each chuck member will still lie on a single plane that is parallel to the central axis of the neck, and will contact the outer cylindrical surface of neck along a single line that is approximately parallel with the central axis. Unlike the engaging grooves provided in a conventional neck chuck mechanism, the clamping parts of the chuck members do not constrain the neck in a direction that displaces the axis of the neck. This means that even if thermal expansion in the chuck members or changes in the outside diameter of the neck cause the neck contacting surfaces of the chuck members to move in a radial direction with respect to the central axis of the neck or in a direction that is parallel to a respective neck contacting surface, the multi-directional clamping action of the three or more chuck members will prevent displacement of the central axis and so enable the neck of the glass bulb to remain properly positioned. As a result, the glass bulb can be held with no misalignment between its axis and the axis of the electron gun.

Cathode ray tubes manufactured using the cathode ray tube manufacturing method of the present invention have better alignment between the axes of the electron gun and the glass bulb, which improves convergence.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

The following describes an embodiment of the present invention with reference to the drawings.

This explanation will begin by describing the construction of a cathode ray tube for use as a color display as one example of a cathode ray tube that can be manufactured by the cathode ray tube manufacturing apparatus of the present invention.

Figure 1:
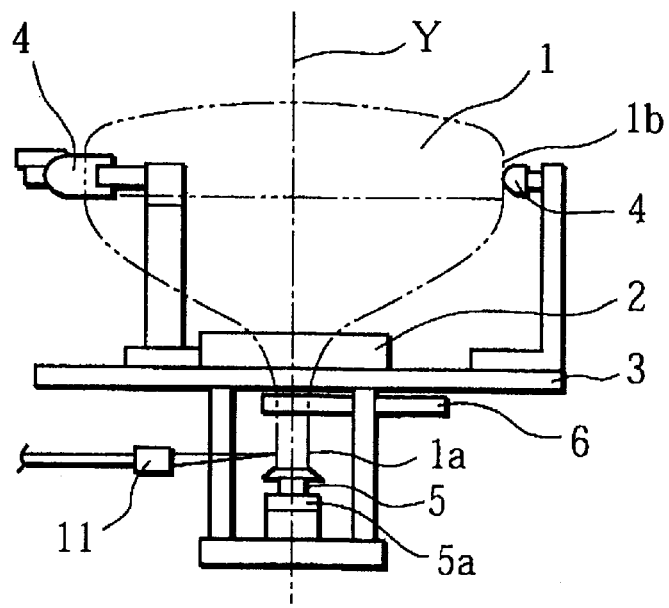
FIG. 1 is a front elevation showing the main components of a conventional cathode ray tube manufacturing apparatus.
Figure 2:
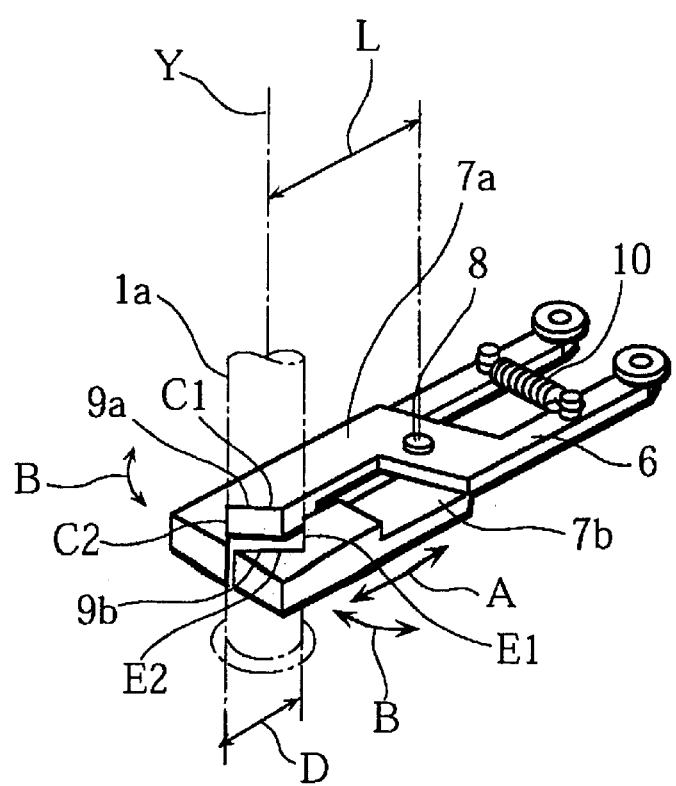
FIG. 2 is a perspective drawing showing the main components of a neck chuck mechanism in this conventional cathode ray tube manufacturing apparatus.
Figure 3:
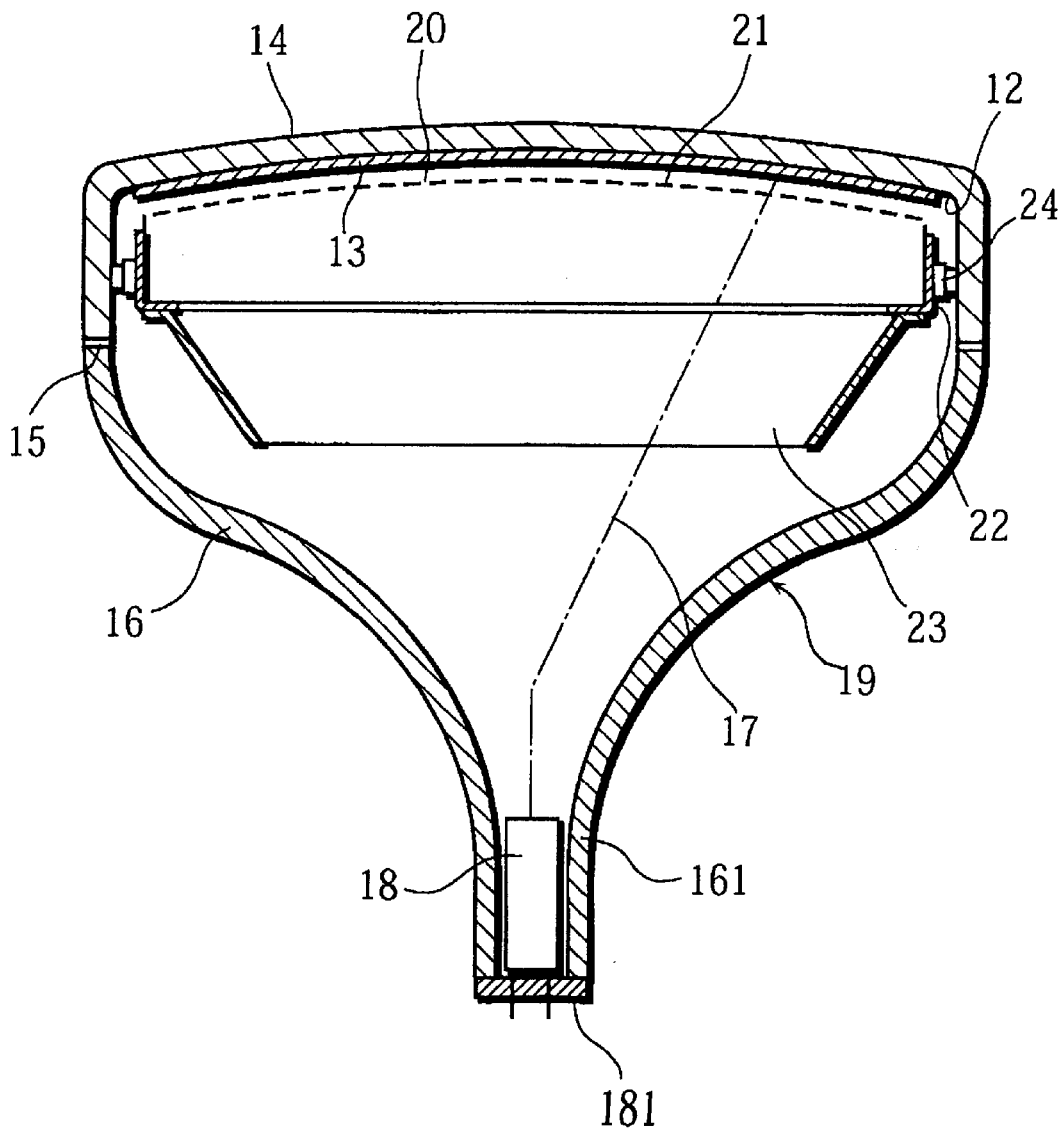
FIG. 3 is a cross-section showing the construction of a cathode ray tube for use as a color display that has been manufactured by the cathode ray tube manufacturing apparatus of the present invention.

FIG. 3 is a cross-section showing the construction of a cathode ray tube. This cathode ray tube is principally composed of a panel 14 and a funnel 16 that is connected to the back of the panel 14 using flit glass 15.

Phosphors 13 of various colors are formed as dots or stripes on the internal face 12 of the panel 14. A narrow neck 161 for attaching the electron gun 18 is formed at the opposite end of the funnel 16 to the panel 14.

A shadow mask 21, a mask frame 22, a magnetic shield plate 23, and a supporting fixture 24 are provided inside the glass bulb 19. The shadow mask 21 includes a plurality of openings 20 that are arranged so as to correspond to the phosphors 13 of the various colors on the panel 14. The mask frame 22 supports the shadow mask 21. The magnetic shield plate 23 is fixed to the electron gun 18 side of the mask frame 22. The supporting fixture 24 supports the mask frame 22 against the glass bulb 19 so that the mask surface of the shadow mask 21 is close to the inner face 12 of the glass bulb 19.

The stem 181 of an in-line electron gun 18 for emitting an electron beam 17 is sealed into an opening in the neck 161 of the glass bulb 19 so that the respective axes of the electron gun 18 and the neck 161 are aligned.

First Embodiment

The following describes the construction of cathode ray tube manufacturing apparatus 100 of the first embodiment of the present invention.

Figure 4:
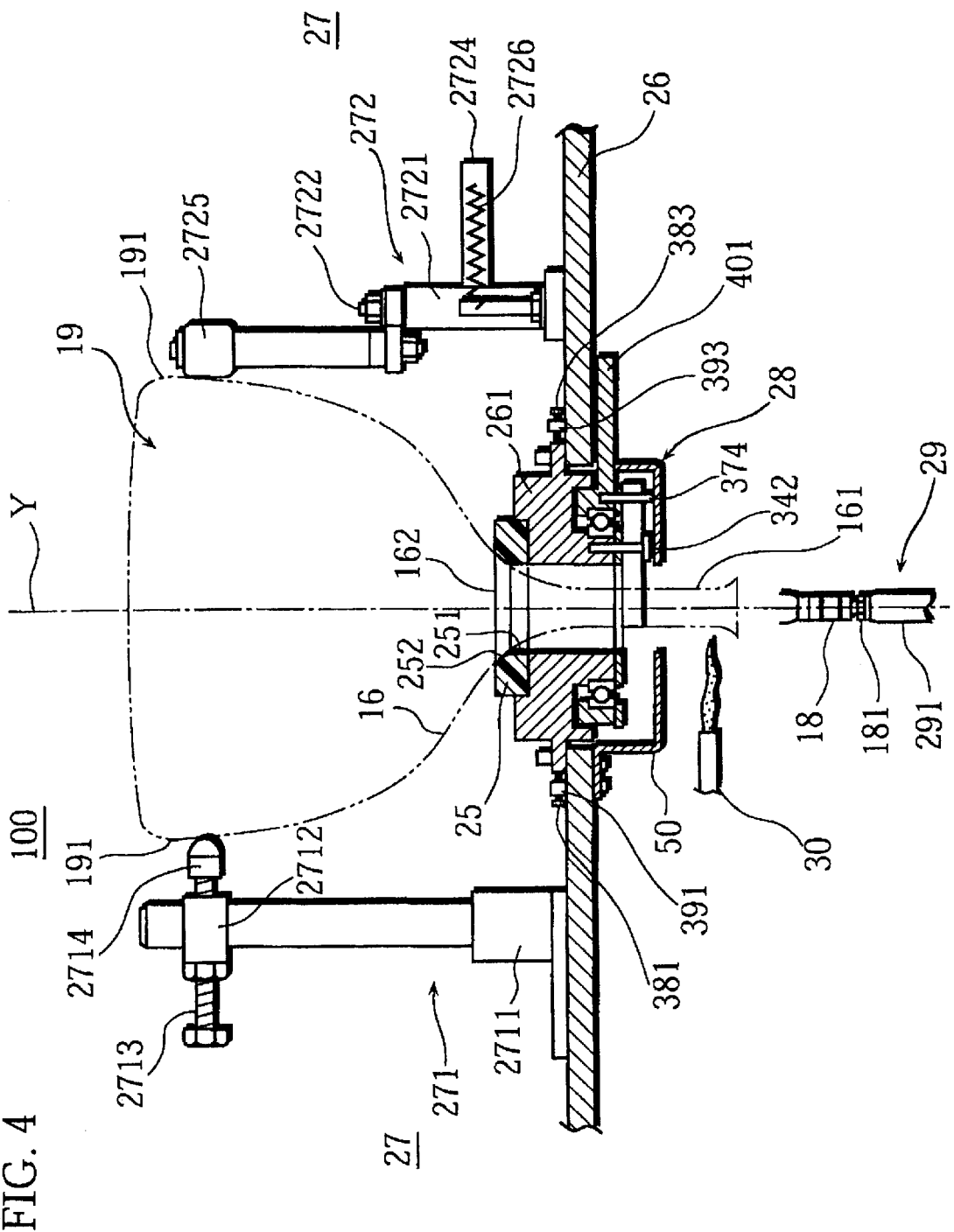
FIG. 4 is a simplified cross-section showing the construction of the cathode ray tube manufacturing apparatus of the first embodiment of the present invention.

FIG. 4 is a simplified cross-section showing the construction of the cathode ray tube manufacturing apparatus of this first embodiment.

The cathode ray tube manufacturing apparatus 100 includes a plate 26, a bulb securing mechanism 27, a neck chuck mechanism 28, an electron gun holding mechanism 29, and a sealing burner 30. The plate 26 supports the bulb receptacle 25 via the intermediate base 261. The bulb securing mechanism 27 is provided on the upper surface of this plate 26. The neck chuck mechanism 28 is provided on the lower surface of the plate 26 and is used to grasp the neck 161 of the glass bulb 19. The electron gun holding mechanism 29 holds the electron gun 18 and inserts the electron gun 18 into the neck 161. The sealing burner 30 is provided between the neck chuck mechanism 28 and the electron gun holding mechanism 29, and heats the neck 161 and the stem 181 of the electron gun 18 that is inserted in the neck 161 with its axis aligned with the axis of the neck 161. By doing so, the sealing burner 30 seals the stem 181 in the neck 161 of the glass bulb 19.

Figure 6:
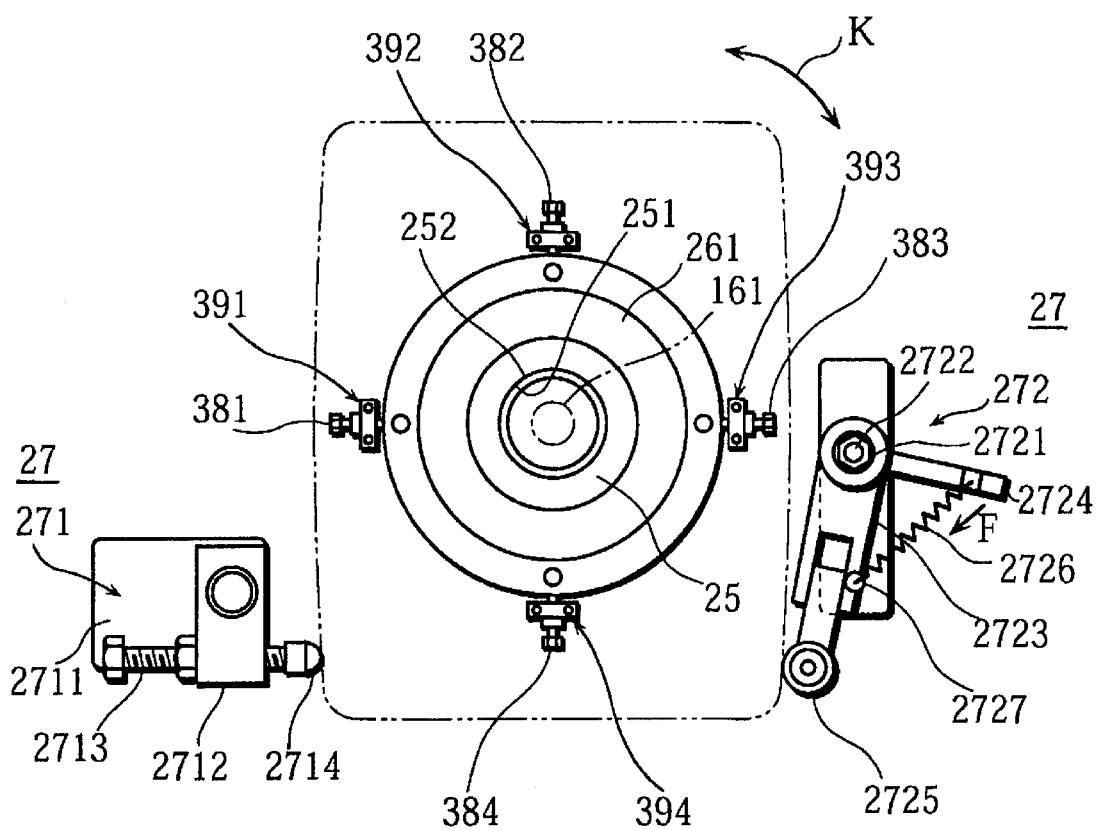
FIG. 6 is an overhead view of the cathode ray tube manufacturing apparatus shown in FIG. 4.

The bulb receptacle 25 and the intermediate base 261 are both ring-shaped and have holes that are concentric with the same diameter (see FIG. 6). The bulb receptacle 25 holds the funnel 16 of the glass bulb 19 precisely at the reference line 162 and keeps the glass bulb 19 horizontal. The bulb receptacle 25 is formed of a resin (such as a thermoplastic polyester resin like polycarbonate) that is softer than the glass of the glass bulb 19 to prevent damage to the glass bulb 19, and a taper 252 is formed in the inner wall 251 of the bulb receptacle 25. This valve receptacle 25 contacts the external surface of the funnel 16 when the glass bulb 19 is inserted from above so as to hold and stabilize the glass bulb 19.

The position of the bulb receptacle 25 with respect to the plate 26 can be slightly adjusted within the plane of the plate 26. This is described in detail later in this specification.

The bulb securing mechanism 27 engages the side surface 191 of the glass bulb 19 at its widest part when the glass valve 19 is held by the bulb receptacle 25. By holding the glass valve 19 on both sides, the valve securing mechanism 27 prevents rotation of the glass bulb 19 from a predetermined position.

The neck chuck mechanism 28 grasps the neck 161 of the glass bulb 19 that is supported by the bulb receptacle 25 so that the axis of the neck 161 is aligned with the axis of the electron gun 18 that will be inserted by the electron gun holding mechanism 29.

Figure 5:
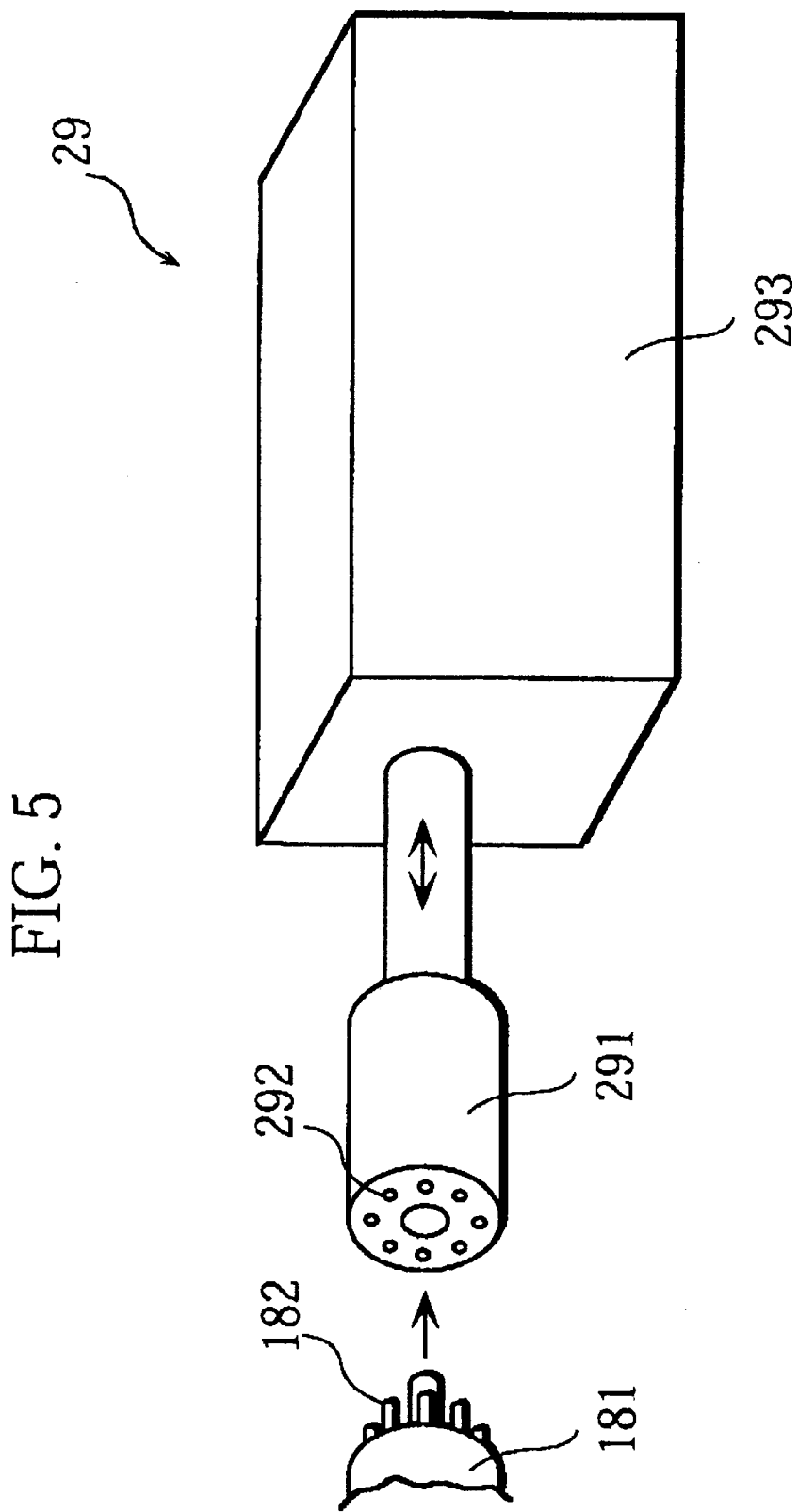
FIG. 5 is a perspective view showing the construction of the electron gun holding mechanism shown in FIG. 4.

As shown in FIG. 5, the electron gun holding mechanism 29 has a socket 291 including pinholes 292 whose number and arrangement matches the plurality of pins 182 provided in the stem 181 of the electron gun 18. When the pins 182 of the electron gun 18 are inserted into these pinholes 292, the electron gun holding mechanism 29 holds the electron gun 18 with their respective axes in alignment. The electron gun holding mechanism 29 also includes an actuator 293 for moving the socket 291 parallel to the axis Y of the neck 161 to a predetermined attaching position. Any conventional device capable of precise positioning along the axis Y can be used as this actuator 293. As one example, suppose that an actuator with a screw feed mechanism is used.

A gas burner that uses propane gas as fuel is used as the sealing burner 30. This gas burner heats the neck 161 to around 800–1000° C. to melt the glass of the neck 161 and so seal the stem 181 in the opening in the neck 161.

A cover 50, which is shaped like a cap and has openings in its middle to allow the neck 161 to protrude downwards and in its side to allow the lever 401 and other such components to protrude outwards, is placed over the periphery of the neck chuck mechanism 28. This cover 50 prevents the heat from the sealing burner 30 from reaching the neck chuck mechanism 28 to the greatest extent possible.

FIG. 6 is an overhead view of the cathode ray tube manufacturing apparatus 100 of FIG. 4. As shown in FIG. 6, the intermediate base 261 is ring-shaped. The bulb receptacle 25, which is attached on the upper surface of the intermediate base 261, is also ring-shaped, and is concentric with the intermediate base 261.

The intermediate base 261 is provided on the upper surface of the plate 26 and is fixed to the plate 26 by the adjusting means 391, 392, 393, 394. Each adjusting means 391, 392, 393, 394 includes a screw (numbered 381, 382, 383, 384 in FIG. 6). By adjusting the screws 381, 382, 383, 384, the center of the bulb receptacle 25 can be aligned with the axis of the electron gun 18 that is held by the electron gun holding mechanism 29.

The bulb securing mechanism 27 is composed of a pad stand 271 and the movable regulating arm 272. The pad stand 271 engages the widest-part side surface 191 of the glass bulb 19 to secure the glass bulb 19 and prevent rotation in the direction K. The movable regulating arm 272 is provided on the opposite side of the glass bulb 19 to the movable regulating arm 272 and presses the glass bulb 19 in the direction of the pad stand 271.

The pad stand 271 has a head 2712 that is fixed at an upper position on the stand 2711. The bolt 2713 has a resin pad 2714 on its end and has a thread which engages a threaded hole in the head 2712 so that the position of the glass bulb 19 about the axis Y can be determined by adjusting the bolt 2713.

The movable regulating arm 272 has a cylindrical member 2721 that holds a first arm 2723 and a second arm 2724 so as to be horizontal with an angle of around 90° between the arms. This cylindrical member 2721 is attached to the plate 26 by a bolt 2722 which allows free rotation of the cylindrical member 2721. A roller 2725 (made of resin) is axially supported on the end of the first arm 2723 with its axis of rotation vertical. The second arm 2724 is energized in the direction shown by the arrow F by an extension spring 2726.

The amount of force applied to the glass bulb 19 by the roller 2725 will differ depending on the size of the glass bulb 19. For a 17–21 inch tube, for instance, an extension spring 2726 that limits the pressure to around 3–4 kg is used.

The bulb securing mechanism 27 with the above construction correctly positions the glass bulb 19 and prevents the glass bulb 19 from rotating in the direction shown by the arrow K. This facilitates the sealing process for the electron gun 18.

The following is a detailed description of the neck chuck mechanism 28.

Figure 7:
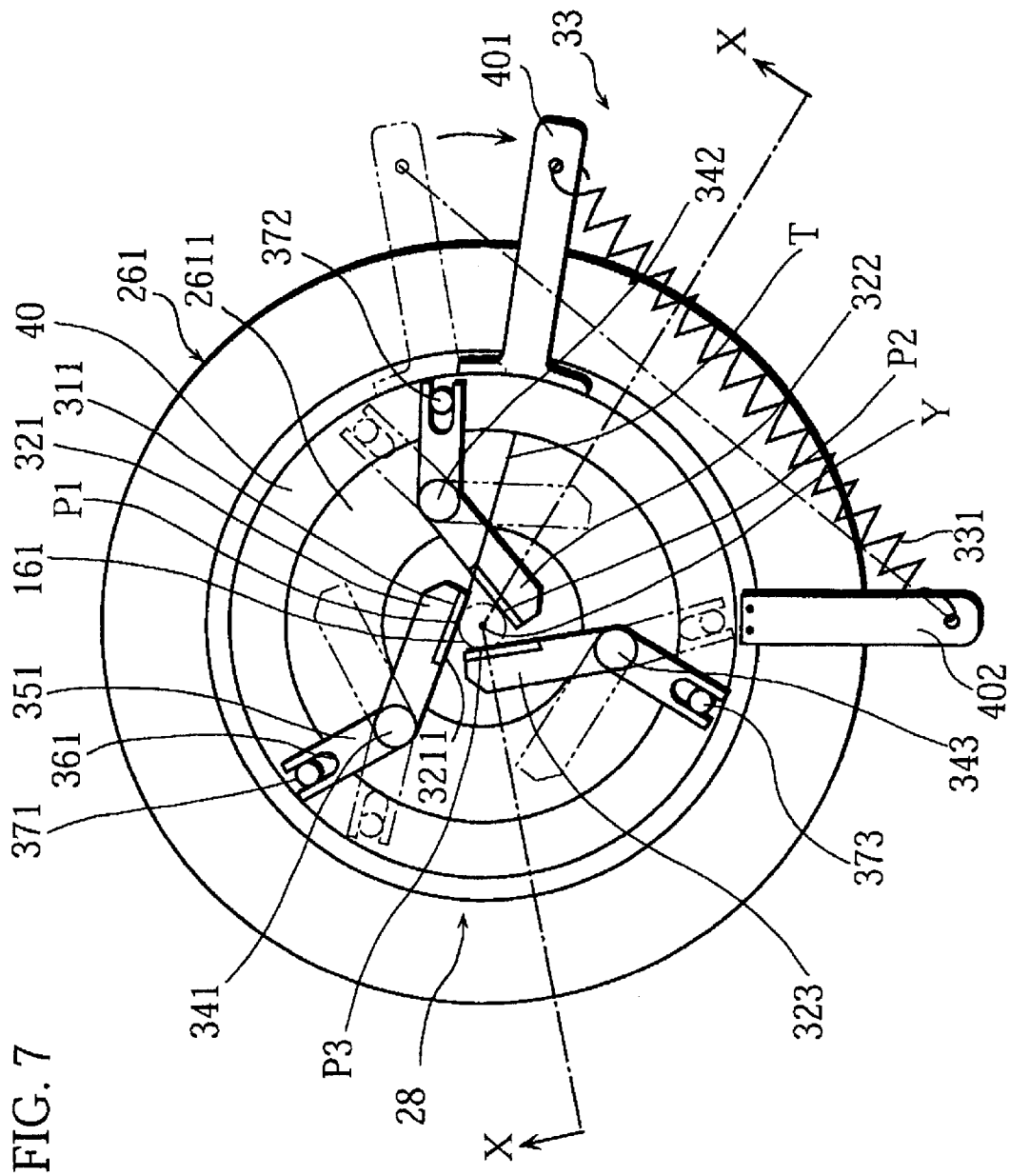
FIG. 7 is an overhead view of the neck chuck mechanism shown in FIG. 4.
Figure 8:
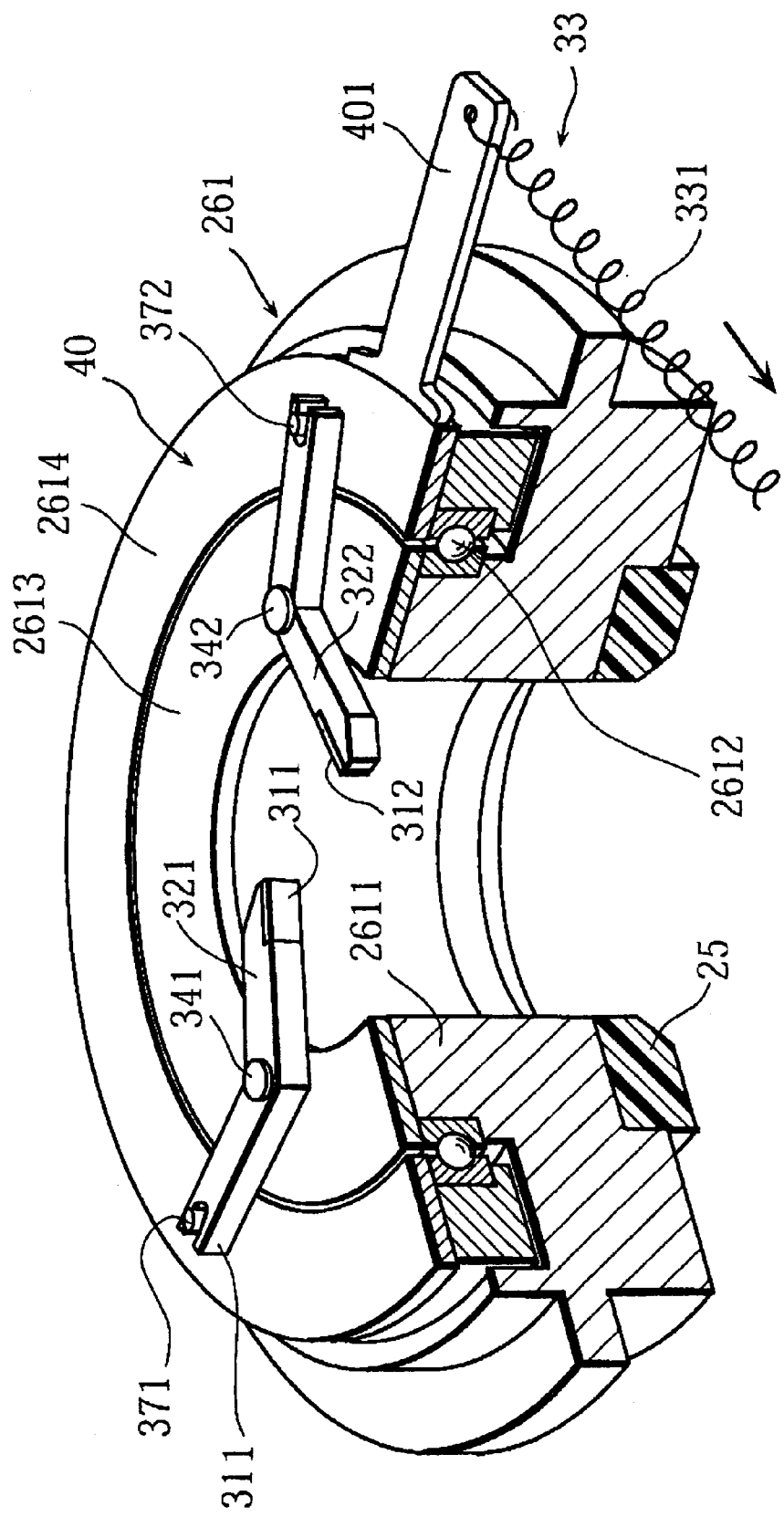
FIG. 8 is a cross-section of the neck chuck mechanism shown in FIG. 7.

FIG. 7 shows the neck chuck mechanism 28 when viewed from above. For simplicity, several components, such as the cover 50 and the plate 26, have been omitted from this drawing. FIG. 8 is a cross-section of the neck chuck mechanism 28 taken along the line X—X in FIG. 7.

As shown in FIG. 7, the neck chuck mechanism 28 includes three chuck members 321, 322, 323 for clamping the outside circumference of the neck 161. These chuck members 321, 322, 323 are respectively axially supported on the principal surface of the narrow ring 2611 of the intermediate base 261 by pins 341, 342, 343 which allow seesaw rotation of the chuck members 321, 322, 323. These chuck members 321, 322, 323 all have the same shape, which is a broad "V", and each have their respective axis of rotation at the vertex of the "V". These axes are equidistant from the axis Y and are positioned so as to divide the circumference of a circle drawn through all three axes with axis Y at the center into three equal line segments.

The following describes chuck member 321 as a representative example of the chuck members 321, 322, 323. A contact member 311 with a flat surface is formed at the part of the chuck member 321 that comes into contact with the outer circumference of the neck 161. This flat surface (the neck contact surface 3211) is parallel to the axis Y and is roughly parallel to the length of the part of the chuck member 321 that extends from the pin 341 to this neck contact surface 3211. When the neck 161 is held by the neck chuck mechanism 28, the neck contact surface 3211 comes into contact with the outer circumference of the neck 161 along a single tangent T within a plane that is perpendicular to the axis y. This neck contact surface 3211 only contacts the outside circumference of the neck 161 along a straight line that is parallel with the axis Y. This type of contact is hereafter called "single tangential contact".

Note that even if the contact member 311 of this chuck member 321 is divided into a plurality of pieces, the neck contact surface 3211 where these pieces come into contact with the outside circumference of the neck 161 only needs to be parallel with the axis Y and included in a single plane that is approximately parallel with the chuck member 321.

The material of the contact member 311 should not be so hard as to damage the surface of the neck 161 and should preferably exhibit a certain degree of heat-resistance. In the present embodiment, hard carbon is used. However, due to the importance of minimizing the thermal expansion of the contact members, materials such as ceramics may be used.

An interlocking ring 40 is support so as to be freely rotatable on the outside of the narrow ring 2611 of the intermediate base 261, and engages the chuck members 321, 322, 323 so as to cause the seesaw movement of the chuck members 321, 322, 323. As shown in FIG. 8, ball bearings 2612 are provided between the interlocking ring 40 and the outside surface of the narrow ring 2611 of the intermediate base 261 to allow the interlocking ring 40 to rotate smoothly. In FIG. 8, the numerals 2613 and 2614 are pressing plates to holding the ball bearings 2612. These plates are respectively attached to the main surfaces of the narrow ring 2611 of the intermediate base 261 and interlocking ring 40 by screws (not illustrated).

Returning to FIG. 7, a U-shaped slit 361 is formed in the opposite end of the chuck member 321 to the contact member 311. This slit 361 engages an engaging pin 371 that projects upwards from the interlocking ring 40. The chuck member 321 is originally in the position shown by the dot-dot-dash line in FIG. 7, but as the interlocking ring 40 rotates clockwise, the chuck member 321 tilts into the position shown by the solid line, where the chuck member 321 comes into single tangential contact with the outer circumference of the neck 161.

The remaining chuck members 322 and 323 have exactly the same interlocking mechanism, and are provided at 120° intervals with rotational symmetry about the axis Y. As the interlocking ring 40 moves, the chuck members 321, 322, 323 tilt with the same tilting angle, so that the contact points P1–P3 of the chuck members 321, 322, 323 act to clamp the neck 161 at the correct position on the axis Y.

As shown in FIG. 7, a lever 401 is provided on the outer surface of the interlocking ring 40 in alignment with the radius of the interlocking ring 40. A lever 402 is also provided on the intermediate base 261. These levers 401, 402 are attached by welding or like, and have holes in their ends to enable an extension spring 331 to be stretched between them. This structure forms an energizing apparatus 22 that energizes the lever 401 in the direction shown in FIG. 7. The energizing force of the extension spring 331 is evenly distributed among the chuck members 321, 322, 323 via the interlocking ring 40 and the engaging pins 371, 372, 373. Since the chuck members 321, 322, 323 are symmetrically provided at 120° intervals about the axis Y, the outside circumference of the neck 161 is clamped with equal force by each of the chuck members 321, 322, 323 via their respective contact members 311, 312, 313 at equal distances from the respective axes of the chuck members 321, 322, 323.

The magnitude of the forces applied by the contact members 311, 312, 313 onto the outside circumference of the neck 161 toward the axis Y due to the extension spring 331 will vary depending on the thickness of the neck 161, but are adjusted so as that the forces applied to the neck of a 17–21 inch tube are around 5–7 kg.

Figure 9:
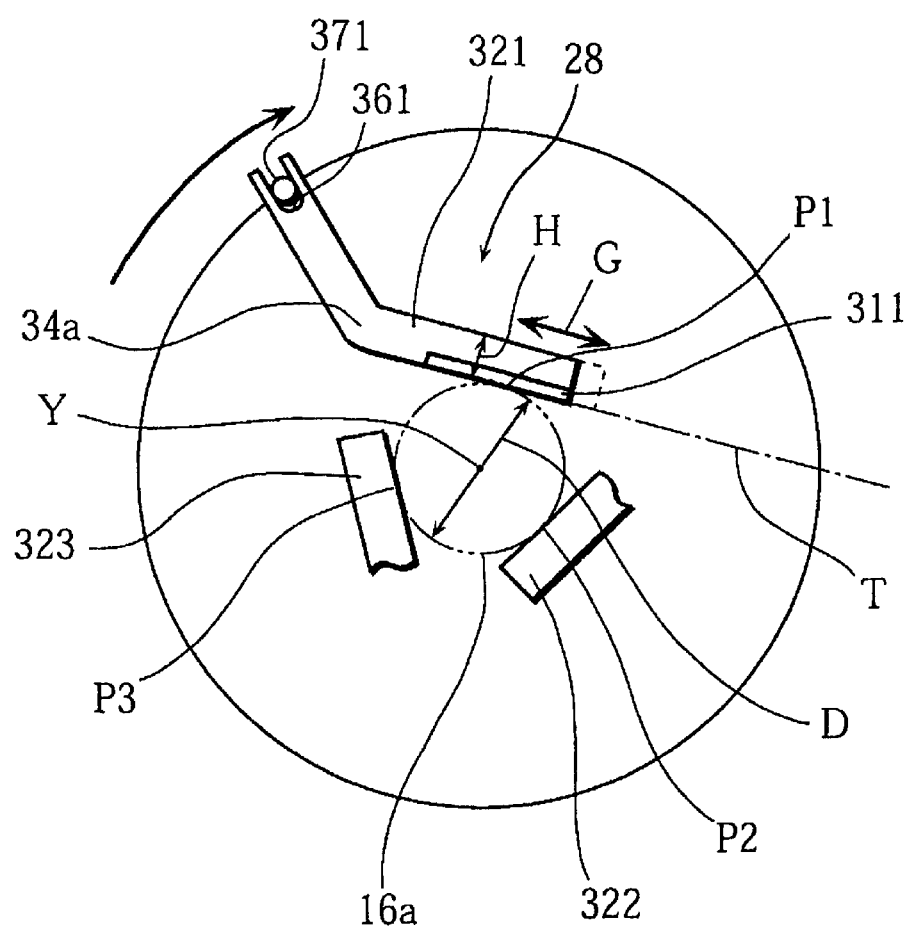
FIG. 9 is a drawing that is used to show the operation of the neck chuck mechanism shown in FIG. 4.

The following describes the operational effects of the neck chuck mechanism 28 of the present embodiment, with reference to FIG. 9.

1. The contact members 311, 312, 313 of the three chuck members 321, 322, 323 that grasp the neck 161 only make single tangential contact with the outside circumference of the neck 161. The neck is not restrained in the lengthwise orientation (arrow G) of the contact members 311, 312, 313 or in the radial direction (arrow H). This means that even if the heat of the sealing burner 30 during the sealing process causes the chuck members 321, 322, 323 to expand in the G or H directions, the contact state of the chuck members 321, 322, 323 will not change, so that there is no displacement of the neck 161 from the axis Y.

In other words, the chuck members 321, 322, 323 will expand by the same amount in the G direction, with these expansions being made in directions that are 120° apart. This means that the heat expansion does not result in a force that would displace the axis of the neck 161. Such expansion may produce a rotational force on the glass bulb 19, but since this is held securely by the bulb securing mechanism 27, the net result is that the contact members 311, 312, 313 slide over the surface of the neck 161. If the chuck members 321, 322, 323 expand in the H direction, the contact surfaces 311, 312, 313 rotate about the respective pins 341, 342, 343, so that the contact surfaces 311, 312, 313 may only move in the radial direction with respect the axis Y of the glass bulb 19.

In this case, the ring shape of the interlocking ring 40 means that the chuck members 321, 322, 323 will all tilt by the same amount and that the energizing force due to the extension spring 331 will be evenly distributed among the contact surfaces 311, 312, 313. These contact surfaces will each move by the same amount when in contact with the outside circumference of the neck 161, which means that the axis Y of the glass bulb 19 will not move.

The chuck members 321, 322, 323 have the same shape and are provided at equal distances from the axis Y at intervals of 120° around a circle centered on the axis Y. This acts to further unify the state in which the contact members 311, 312, 313 contact the outside circumference of the neck 161, and further prevents displacement of the neck 161 from the axis Y.

The above construction ensures that there will be no misalignment of the electron gun 18 with respect to the glass bulb 19 due to thermal expansion during the sealing process.

2. When manufacturing a variety of glass bulbs 19 (either different types of glass bulb or glass bulbs of a same type where there is variation in the external diameter of the neck) whose necks 161 have different external diameters D, the contact surfaces 311, 312, 313 are only able to tilt by the same amount about the respective pins 341, 342, 343, so that the contact surfaces 311, 312, 313 may only move by the same amount in the radial direction with respect the axis Y of the glass bulb 19, as when there is thermal expansion in the H direction. Accordingly, the axis of the neck 161 is not displaced.

As a result, the electron gun 18 is better aligned with the axis Y of the glass bulb 19 in cathode ray tubes manufactured by the cathode ray tube manufacturing apparatus of the present embodiment than in cathode ray tubes manufactured by a conventional manufacturing apparatus. This means that cathode ray tubes manufactured by the present embodiment have better convergence and improved color purity. There is also the added benefit that a large reduction can be made in the time required to adjust the convergence when assembling a cathode ray tube apparatus.

In the present embodiment, the chuck members 321, 322, 323 are retracted by manually pushing the lever 401 in the opposite direction to the energizing force of the energizing spring 331 (i.e., the opposite direction to the arrow shown in FIG. 7). However, the chuck members 321, 322, 323 may alternatively be opened and closed using a suitable shifting mechanism, such as an air cylinder.

Second Embodiment

In the first embodiment, the neck chuck mechanism 28 of the cathode ray tube manufacturing apparatus 100 has the chuck members 321, 322, 323 axially supported on the intermediate base 261. These chuck members 321, 322, 323 are tilted with rotational symmetry of 120° about the axis Y by the interlocking ring 40, so that the neck 161 of the glass bulb 19 is clamped with its axis aligned with the axis of the electron gun 18. However, the present invention is not limited to this arrangement. As one example of an alternative construction, three sliding bodies that slide toward the axis Y may be used as the chuck members, and an interlocking means that moves each of the sliding bodies toward the axis Y with the same displacement may be provided.

Figure 10:
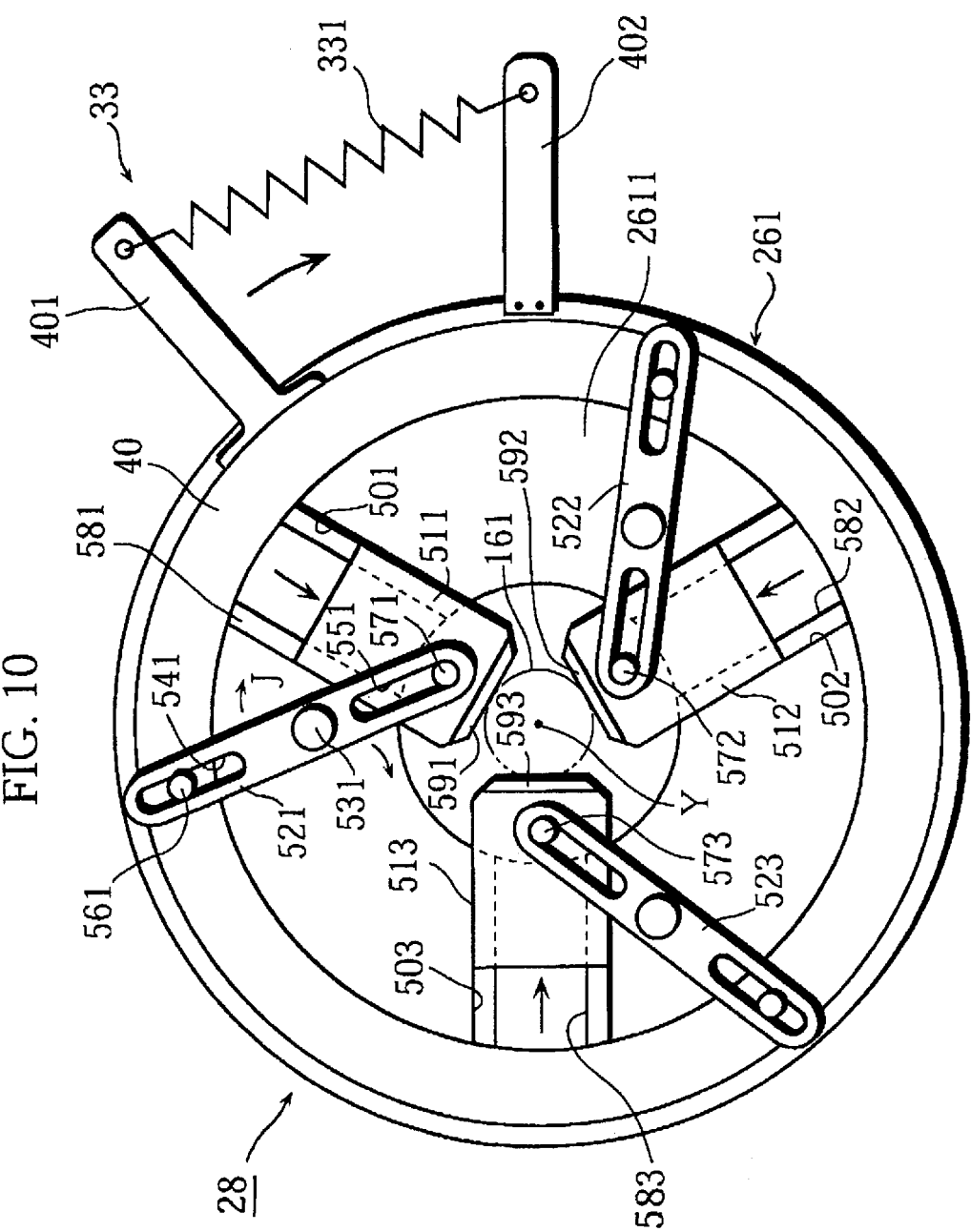
FIG. 10 is an overhead view of the construction of the neck chuck mechanism of the cathode ray tube manufacturing apparatus of the second embodiment of the present invention.

FIG. 10 is an overhead view of a specific example of such a neck chuck mechanism 28. Note that components in FIG. 10 that are the same as their counterparts in FIG. 7 have been given the same reference numerals.

Three slide grooves 501, 502, 503 that extend in alignment with radii of the narrow ring 2611 are provided on the narrow ring 2611 of the intermediate base 261. These slide grooves 501, 502, 503 are positioned so as to divide the circumference of the narrow ring 2611 into three equal parts. Chuck members (sliding bodies) 511, 512, 513 are provided at the innermost parts of these slide grooves 501, 502, 503, with these chuck members 511, 512, 513 being able to slide along the slide grooves 501, 502, 503. To prevent the chuck members 511, 512, 513 coming out of the slide grooves 501, 502, 503, a rail groove (not illustrated) is provided on each side of the sliding surface of the chuck members 511, 512, 513 parallel to the sliding direction of the chuck members 511, 512, 513, and protruding rails 581, 582, 583 that engage the rail grooves are provided at corresponding positions on the inner walls of the slide grooves 501, 502, 503.

The chuck members 511, 512, 513 are respectively linked to the interlocking ring 40 by the cranks 521, 522, 523, so that the chuck members 511, 512, 513 slide by an equal amount toward the axis Y when the interlocking ring 40 rotates.

The slide construction is the same for each of the chuck members 511, 512, 513, so that the following explanation describes only the chuck member 511 as a representative example.

The crank 521 is axially supported on the narrow ring 2611 by the axial pin 531 that is located near the middle of the crank 521. Long holes 541, 551 are provided on either side of this axial pin 531, with the long hole 541 engaging an engaging pin 561 disposed on the interlocking ring 40 and the long hole 551 engaging an engaging pin 571 disposed on the chuck member 511.

When the interlocking ring 40 is rotated by the extension spring 331 in the direction shown by the arrow in FIG. 10 (i.e., clockwise), the crank 521 rotates about the axial pin 531 in the direction J, and this resulting cranking action has the chuck member 511 slide along the slide groove 501 toward the axis Y. This results in the contact member 591, which is formed on the end of the chuck member 511 and has a contact surface which is parallel to the axis Y, coming into single tangential contact with the outside circumference of the neck 161. Identical cranks (522,523) and engaging pins are provided in corresponding locations for the remaining chuck members 512, 513, so that rotation of the interlocking ring 40 results in the chuck members 511, 512, 513 moving by the same amount toward the axis Y. This means that the neck 161 can be securely grasped with its axis Y in certain alignment with the center of the intermediate base 261.

Like the first embodiment, this construction can attain the aforementioned technical effect of securely holding the glass bulb 19 with its axis properly aligned.

If thermal expansion during the sealing process causes each chuck member to expand in a direction that is perpendicular to the sliding direction, the contact member of each chuck member will still only contact the neck 161 along a single tangent. The neck 161 is not restricted in the perpendicular direction, so that no displacement of the neck 161 will occur.

Also, if thermal expansion causes increases in the distances from the engaging pins 571, 572, 573 to the corresponding contact members 591, 592, 593, such increases will be approximately equal and will be countered by the equal and opposing energizing force applied by the extension spring via the linked action of the interlocking ring 40 and the cranks 521, 522, 523. This means that the neck 161 will continue to be grasped and that the positions of the engaging pins 571, 572, 573 will be displaced equally by a distance equal to the increase due to the thermal expansion. As a result, the axis Y will not be displaced from the correct alignment.

For the reasoning given above, changes in the outside diameter of the neck 161 will only result in the respective chuck members sliding forward or backward by an equal amount in the radial direction. The rotational symmetry of the clamping positions of the neck 161 will be maintained, so that the neck 161 will be held with its axis properly aligned with the axis Y.

As described above, the cathode ray tube manufacturing apparatus of the present invention is designed so that the three chuck members that clamp the neck of the glass bulb are only in contact with the external surface of the neck along a single tangent T. The axis of the glass bulb can be kept in alignment with the axis of the electron gun, even if, for example, the heat from the sealing burner causes thermal expansion in the chuck members during the sealing process, or if the cathode ray tube manufacturing apparatus is used to manufacture a variety of glass bulbs whose necks have different outside diameters.

Note that while the present embodiment states that the chuck members were equidistantly arranged around the circumference of the narrow ring 2611, the chuck members do not need to be precisely equidistant provided that the outside circumference of the neck 161 can be properly clamped via positions that exhibit at least some rotational symmetry about the axis Y.

While the linked ring 40 is described as rotating around the narrow ring 2611 in the above embodiments, such rotation only needs to be relative, so that either or both of the linked ring 40 and the narrow ring 2611 may rotate.

Finally, while the above embodiments describe the case where the neck 161 is clamped by three chuck members, it should be obvious that a construction with four or more chuck members could be used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A cathode ray tube manufacturing apparatus that holds a neck of a glass bulb using a chuck apparatus and seals an electron gun in the neck, the chuck apparatus comprising:
    at least three chuck members, each chuck member having
        a neck contacting surface that lies on a single plane that is parallel with a central axis of the neck; and
    chuck member holding means for holding the chuck members so as to allow movement of the neck contacting surface of each chuck member from a periphery of the neck toward the central axis of the neck.

2. The cathode ray tube manufacturing apparatus of claim 1, further comprising interlocking means for causing an interlocked movement of the chuck members so that the neck contacting surface of each chuck member moves with an equal displacement toward the central axis of the neck.

3. The cathode ray tube manufacturing apparatus of claim 2, wherein the chuck member holding means includes a first ring member with a central hole that allows the neck to be inserted, and the interlocking means includes:

a second ring member that is provided on an outside of the first ring member and has a center that coincides with the central axis of the neck, wherein at least one of the first and second ring members is capable of a rotation that changes a positional relationship between the first and second ring members; and linking means that converts the rotation of at least one of the first and second ring members into movements that change a position of each chuck member in a respective direction of movement of each chuck member.

4. The cathode ray tube manufacturing apparatus of claim 2, wherein each chuck member is axially supported by the chuck member holding means so that the neck contacting surface swings toward the central axis of the neck, and the interlocking means causes an interlocked movement of the chuck members so that the neck contacting surface of each chuck member swings with an equal angle.

5. The cathode ray tube manufacturing apparatus of claim 4, wherein the chuck members each have substantially a same shape, and are axially supported by the chuck member holding means at equidistant positions around a circle whose center coincides with the central axis of the neck.

6. The cathode ray tube manufacturing apparatus of claim 2, wherein the chuck members are held by the chuck member holding means so as to allow the neck contacting surface of each chuck member to slide toward the central axis of the neck, and the interlocking means causes an interlocked movement of the chuck members so that the neck contacting surface of each chuck member is kept equidistant from the central axis of the neck.

7. The cathode ray tube manufacturing apparatus of claim 6, wherein the chuck members each have substantially a same form, are located at equidistant positions around a circle whose center coincides with the central axis of the neck, and are supported by the chuck member holding means so as to allow sliding parallel to a radius of the neck.

8. The cathode ray tube manufacturing apparatus of claim 2, further comprising an energizing means for energizing each chuck member so that the neck contacting surface of each chuck member approaches the central axis of the neck.

9. The cathode ray tube manufacturing apparatus of claim 8, wherein the energizing means applies an equal energizing force to each chuck member.

10. The cathode ray tube manufacturing apparatus of claim 9, wherein the energizing means applies an equal energizing force to each chuck member by distributing an energizing force produced by a single energizing force producing means among the chuck members via the interlocking means.

11. The cathode ray tube manufacturing apparatus of claim 1, wherein a neck contacting part that contains the neck contacting surface of each chuck member is made of hard carbon.

12. The cathode ray tube manufacturing apparatus of claim 1, wherein a neck contacting part that contains the neck contacting surface of each chuck member is made of a ceramic material.

13. A manufacturing method for manufacturing a cathode ray tube, the manufacturing method including a holding step for holding a glass bulb and an attaching step for attaching an electron gun in a neck of the glass bulb, the holding step including:

a first substep for supporting a funnel of the glass valve using a receptacle part of a receptacle member that is disposed in an approximately horizontal state;

a second substep for grasping the neck so that a central axis of the neck is aligned with an axis of the electron gun, using a chuck mechanism having at least three chuck members, each chuck member having a neck contacting surface that contacts a part of the neck protruding downwards through the receptacle part of the receptacle member, each neck contacting surface contacting the neck on a single plane that is parallel to the central axis of the neck.

* * * * *